United States Patent
Li et al.

(10) Patent No.: US 10,863,072 B2
(45) Date of Patent: Dec. 8, 2020

(54) IMAGE PROCESSING SYSTEM, METHOD, APPARATUS AND DEVICE OF PROCESSING IMAGE DATA

(71) Applicant: SZ DJI TECHNOLOGY CO., LTD., Shenzhen (CN)

(72) Inventors: Shunnian Li, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/860,143

(22) Filed: Jan. 2, 2018

(65) Prior Publication Data

US 2018/0124302 A1     May 3, 2018

Related U.S. Application Data

(63) Continuation of application No. PCT/CN2015/083219, filed on Jul. 2, 2015.

(51) Int. Cl.
| | |
|---|---|
| *H04N 5/232* | (2006.01) |
| *B64C 39/02* | (2006.01) |
| *B64D 47/08* | (2006.01) |
| *G05D 1/00* | (2006.01) |

(52) U.S. Cl.
CPC ....... *H04N 5/23206* (2013.01); *B64C 39/024* (2013.01); *B64D 47/08* (2013.01);
(Continued)

(58) Field of Classification Search
CPC ............ H04N 5/2353; H04N 5/23203; H04N 5/2351; H04N 5/23245; H04N 5/235; H04N 5/23206; H04N 5/23216; H04N 5/23296; G06T 7/0002; G06T 7/80; B64C 2201/141; B64C 39/024; B64C 2201/127; B64C 2201/027; B64C 2201/108; B64C 2201/146; B64C 2201/024; B64D 47/08; G05D 1/0038
(Continued)

(56) References Cited

U.S. PATENT DOCUMENTS 6,809,759 B1 * 10/2004 Chiang .............. H04N 5/23293
                                                          348/211.2
6,819,355 B1 * 11/2004 Niikawa ............ H04N 1/00204
                                                          348/207.11
(Continued)

FOREIGN PATENT DOCUMENTS

| CN | 101979961 A | 2/2011 |
|---|---|---|
| CN | 103809600 A | 5/2014 |
| CN | 103941746 A | 7/2014 |

OTHER PUBLICATIONS

The World Intellectual Property Organization (WIPO) International Search Report and Written Opinion for PCT/CN2015/083219 dated Mar. 25, 2016 8 Pages.

*Primary Examiner* — Albert H Cutler
(74) *Attorney, Agent, or Firm* — Anova Law Group, PLLC

(57) ABSTRACT

A method of processing image data performed by an image capturing end includes receiving an image control instruction from a control end, performing, in response to the image control instruction, an image processing operation based upon the image control instruction to obtain image data, and providing the image data to the control end.

17 Claims, 10 Drawing Sheets

(52) U.S. Cl.
CPC ..... *H04N 5/23216* (2013.01); *H04N 5/23296* (2013.01); *B64C 2201/024* (2013.01); *B64C 2201/027* (2013.01); *B64C 2201/108* (2013.01); *B64C 2201/127* (2013.01); *B64C 2201/146* (2013.01); *G05D 1/0038* (2013.01)

(58) Field of Classification Search
USPC ............... 348/333.01–333.12, 143–159, 348/211.99–211.9
See application file for complete search history.

(56) References Cited

U.S. PATENT DOCUMENTS

| | | | | |
|---|---|---|---|---|
| 8,553,099 B2 * | 10/2013 | Tsuchiya | ............... | H04N 5/232 348/207.11 |
| 2007/0229680 A1 * | 10/2007 | Kinney | ............... | G06T 3/40 348/240.2 |
| 2009/0115848 A1 | 5/2009 | Liang | | |
| 2010/0026848 A1 * | 2/2010 | Kakehi | ............... | H04N 5/23293 348/231.99 |
| 2015/0189221 A1 * | 7/2015 | Nakase | ............... | G11B 27/30 386/225 |
| 2015/0215514 A1 * | 7/2015 | Barabas | ............... | H04N 5/23203 348/211.2 |
| 2016/0065845 A1 * | 3/2016 | Tokunaga | ............... | G06F 3/0482 348/207.11 |
| 2016/0065849 A1 * | 3/2016 | Homma | ............... | H04N 5/23293 348/36 |
| 2016/0165142 A1 * | 6/2016 | Hada | ............... | H04N 5/23293 348/211.1 |
| 2016/0327950 A1 * | 11/2016 | Bachrach | ............... | G05D 1/0016 |

* cited by examiner

IMAGE PROCESSING SYSTEM, METHOD, APPARATUS AND DEVICE OF PROCESSING IMAGE DATA

CROSS-REFERENCE TO RELATED APPLICATION

This is a continuation application of International Application No. PCT/CN2015/083219, filed on Jul. 2, 2015, the entire contents of which are incorporated herein by reference.

TECHNICAL FIELD

The present disclosure relates to image processing, and more particularly to an aircraft-based image processing system, and a method, an apparatus and a device of processing image data.

BACKGROUND OF THE DISCLOSURE

Aerial photography is becoming more and more popular in recent years. Users can take photographs of the ground, landscape, scenery and people using various flight platforms including helicopters, hot air balloons and multi-rotor unmanned aerial vehicles capable of being remotely controlled. Aerial photography can be used in military, transportation, disaster relief applications in addition to photographic art.

In prior art aerial photography, images can be transmitted to a user end via a wireless link (e.g., Wi-Fi), and the received images can be displayed at the user end in substantially real time such that the user can observe the images. However, the user end can only passively receive the aerial image data and no user control on the aerial image data is available.

SUMMARY OF THE DISCLOSURE

The disclosure provides an aircraft-based image processing system, and a method, an apparatus and a device of processing image data. With the technical solutions of the disclosure, the user's control on aerial data can be effected.

A first aspect of the disclosure provides an aircraft-based image processing system, said image processing system comprising an aircraft, an image capturing device onboard the aircraft and a control device, the aircraft being provided with data processing device. The image capturing device can be configured to capture images in a flight of the aircraft. The data processing device can be configured to receive an image control instruction from the control device, communicate with the image capturing device, perform an image processing operation based upon the image control instruction and provide image data as a result of the image processing operation to the control device. The control device can be configured to generate the image control instruction, provide the image control instruction to the data processing device and receive data from the data processing device.

In some embodiments, the data processing device can be further configured to provide obtained human-computer interaction interface UI data to the control device. The control device can be further configured to display an image and receive the image control instruction to be applied onto the image based upon the human-computer interaction interface UI data.

In some embodiments, the data processing device can be further configured to obtain human-computer interaction interface UI data of the image capturing device and provide the obtained human-computer interaction interface UI data of the image capturing device to the control device.

In some embodiments, the data processing device can be further configured to provide obtained human-computer interaction interface UI data to the control device. The control device can be further configured to add an operating event to the received human-computer interaction interface UI, and display an image and receive the image control instruction to be applied onto the image based upon the human-computer interaction interface UI data and the added operating event.

In some embodiments, the image control instruction generated by the control device can comprise an image playback instruction, an image movement instruction, an image zooming instruction, an image paging up/down instruction and/or an image deleting instruction on one or more images. The data processing device can be configured to communicate with the image capturing device, obtain an image identified by the image control instruction and perform an image playback, an image movement, an image zooming, an image paging up/down and an image deleting on one or more images based upon the image control instruction.

In some embodiments, the data processing device can be configured to communicate with the image capturing device, process the received image control instruction and provide the processed image control instruction to the image capturing device. The image capturing device can be further configured to perform an image processing operation based upon the processed image control instruction and provide image data as a result of the image processing operation to the data processing device.

In some embodiments, the image capturing device can be configured to perform an image playback, an image movement, an image zooming, an image paging up/down and an image deleting on one or more images based upon the processed image control instruction.

In some embodiments, the data processing device can be further configured to, upon receiving the image control instruction from the control device, suspend an image transmission if the data processing device is currently transmitting images to the control device.

In some embodiments, the control device can be further configured to, upon receiving an image processing operation from a user, temporarily save a currently received image and suspend an image transmission or a processing on a transmitted image if the control device is currently transmitting images to the data processing device.

A second aspect of the disclosure further provides a method of processing image data, said method comprising an image capturing end receiving an image control instruction from a control end; the image capturing end, in response to the image control instruction, performing an image processing operation based upon the image control instruction; and the image capturing end providing image data as a result of the image processing operation to the control end.

In some embodiments, the method can further comprise the image capturing end providing obtained human-computer interaction interface UI data to the control end, such that the control end can display an image and receive the image control instruction to be applied onto the image based upon the human-computer interaction interface UI data.

In some embodiments, the image capturing end can capture image data using an external camera, the method further comprising the image capturing end obtaining human-computer interaction interface UI data of the external camera and providing the obtained human-computer interaction interface UI data of the external camera to the control end.

In some embodiments, the received image control instruction can comprise an image playback instruction, an image movement instruction, an image zooming instruction, an image paging up/down instruction and/or an image deleting instruction on one or more images. The image processing operation performed by the image capturing end can comprise an image playback, an image movement, an image zooming, an image paging up/down and an image deleting on one or more images based upon the image control instruction.

In some embodiments, the method can further comprise, upon receiving the image control instruction from the control end, the image capturing end suspending an image transmission if the image capturing end is currently transmitting images to the control end.

A third aspect of the disclosure further provides an image capturing apparatus, said image capturing apparatus comprising a receiving circuit configured to receive an image control instruction from a control end; a processing circuit configured to, in response to the image control instruction, perform an image processing operation based upon the image control instruction; and a sending circuit configured to provide image data as a result of the image processing operation to the control end.

In some embodiments, the apparatus can further comprise an obtaining circuit configured to obtain human-computer interaction interface UI data. The sending circuit can further configured to provide a stored human-computer interaction interface UI data to the control end. In some embodiments, the apparatus can capture image data using an external camera, the apparatus further comprising an obtaining circuit configured to obtain human-computer interaction interface UI data of the external camera. The sending circuit can further configured to provide the obtained human-computer interaction interface UI data of the external camera to the control end.

In some embodiments, the processing circuit can be configured to, in response to the image control instruction, perform an image playback, an image movement, an image zooming, an image paging up/down and an image deleting on one or more images based upon the image control instruction.

In some embodiments, the processing circuit can be further configured to, upon the receiving circuit receives the image control instruction from the control end, suspend an image transmission if the processing circuit is currently transmitting images to the control end.

A fourth aspect of the disclosure further provides an image capturing device, the image capturing device being connected with a control device, the image capturing device comprising a communication circuit and a processor. The communication circuit can be configured to communicate with the processor and the control device. The processor can be configured to receive an image control instruction from the control device via the communication circuit, perform, in response to the image control instruction, an image processing operation based upon the image control instruction, and provide image data as a result of the image processing operation to the control device via the communication circuit.

In some embodiments, the processor can be further configured to provide obtained human-computer interaction interface UI data to the control device via the communication circuit, such that the control device can display an image and receive the image control instruction to be applied onto the image based upon the human-computer interaction interface UI data.

In some embodiments, the device can capture image data using an external camera. The processor can be further configured to obtain human-computer interaction interface UI data of the external camera and provide the obtained human-computer interaction interface UI data of the external camera to the control device via the communication circuit.

In some embodiments, the processor can be configured to, in response to the image control instruction, perform an image playback, an image movement, an image zooming, an image paging up/down and an image deleting on one or more images based upon the image control instruction.

In some embodiments, the processor can be further configured to, upon the communication circuit receives the image control instruction from the control device, suspend an image transmission if the processor is currently transmitting images to the control device.

A fifth aspect of the disclosure further provides a method of processing image data, said method comprising a control end generating an image control instruction based upon a user operation, and providing the generated image control instruction to an image capturing end which is controlled by the control end; and the control end receiving processed image data, which is processed and returned by the image capturing end, and displaying an image corresponding to the processed image data.

In some embodiments, the method can further comprise the control end displaying the last received image data before displaying the processed image data.

In some embodiments, the method, before the control end generating an image control instruction based upon a user operation, can further comprise the control end receiving human-computer interaction interface UI data from the image capturing end, parsing the human-computer interaction interface UI data and displaying the parsed human-computer interaction interface UI to receive the user operation on the UI and generate the image control instruction.

In some embodiments, the control end parsing the human-computer interaction interface UI data can comprise the control end parsing the human-computer interaction interface UI data and adding an operating event.

In some embodiments, the added operating event can comprise a touch event.

In some embodiments, the human-computer interaction interface UI data can be data associated with a human-computer interaction interface UI which is configured in the image capturing end. Alternatively, the human-computer interaction interface UI data can be data associated with a human-computer interaction interface UI of an external camera which is connected with the image capturing end.

In some embodiments, the image control instruction generated by the control end can comprise an image playback instruction, an image movement instruction, an image zooming instruction, an image paging up/down instruction and/or an image deleting instruction on one or more images.

A sixth aspect of the disclosure further provides a control apparatus, said control apparatus comprising a processing circuit configured to generate an image control instruction based upon a user operation and provide the generated image control instruction to an image capturing end which is controlled by the processing circuit; a receiving circuit configured to receive processed image data which is processed and returned by the image capturing end; and a display configured to display an image corresponding to the processed image data.

In some embodiments, the display can be further configured to display the last received image data before displaying the processed image data.

In some embodiments, the receiving circuit can be further configured to receive human-computer interaction interface UI data from the image capturing end. The processing circuit can be further configured to parse the human-computer interaction interface UI data. The display can be further configured to display the parsed human-computer interaction interface UI to receive the user operation on the UI for generating the image control instruction.

In some embodiments, the processing circuit can be configured to parse the human-computer interaction interface UI data and add an operating event.

In some embodiments, the operating event added by the processing circuit can comprise a touch event.

In some embodiments, the human-computer interaction interface UI data can be data associated with a human-computer interaction interface UI which is configured in the image capturing end. Alternatively, the human-computer interaction interface UI data can be data associated with a human-computer interaction interface UI of an external camera which is connected with the image capturing end.

In some embodiments, the image control instruction generated by the processing circuit can comprise an image playback instruction, an image movement instruction, an image zooming instruction, an image paging up/down instruction and/or an image deleting instruction on one or more images.

A seventh aspect of the disclosure further provides a control device, the control device being connected with an image capturing device, and the control device comprising a communication circuit and a processor. The communication circuit can be configured to be connected with the image capturing device and the processor. The processor can be configured to generate an image control instruction based upon a user operation, provide the generated image control instruction via the communication circuit to an image capturing device which is controlled by the processor, receive via the communication circuit processed image data which is processed and returned by the image capturing device, and display an image corresponding to the processed image data.

In some embodiments, the processor can be further configured to display the last received image data before displaying the processed image data.

In some embodiments, the communication circuit can be further configured to receive human-computer interaction interface UI data from the image capturing device. The processor can be further configured to parse the human-computer interaction interface UI data and display a parsed human-computer interaction interface UI to receive the user operation on the UI and generate the image control instruction.

In some embodiments, the processor can be configured to parse the human-computer interaction interface UI data and add an operating event.

In some embodiments, the operating event added by the processing circuit can comprise a touch event.

In some embodiments, the human-computer interaction interface UI data can be data associated with a human-computer interaction interface UI which is configured in the image capturing device. Alternatively, the human-computer interaction interface UI data can be data associated with a human-computer interaction interface UI of an external camera which is connected with the image capturing device.

In some embodiments, the image control instruction can comprise an image playback instruction, an image movement instruction, an image zooming instruction, an image paging up/down instruction and/or an image deleting instruction on one or more images With the technical solutions of the disclosure, the user's manipulation on aerial data can be effected.

DETAILED DESCRIPTION OF THE DISCLOSURE

A better understanding of the disclosure will be obtained by reference to the following detailed description that sets forth illustrative embodiments with reference to the drawings. It will be apparent that, the embodiments described herein are merely provided by way of example. Those skilled in the art can conceive various embodiments in light of those embodiments disclosed herein without inventive efforts, and all these embodiments are within the scope of the disclosure.

With embodiments of the disclosure, a user can communicate with an aircraft using a remote controller to control an image capturing device (e.g., a camera) for aerial photography, such that a control of aerial images can be effected. The user can alternatively directly communicate with an image capturing device at an aircraft end to effect a control of aerial images.

Figure 1:
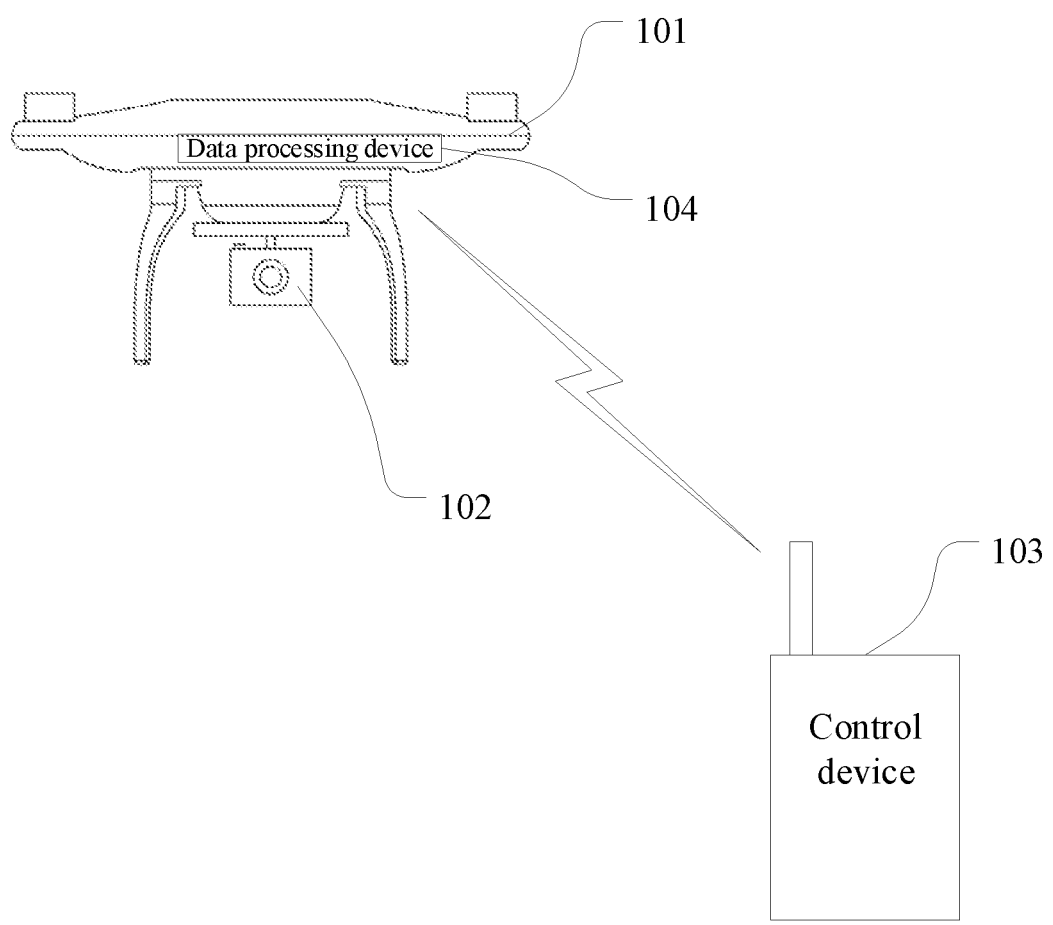
FIG. 1 shows a structure of an aircraft-based image processing system in accordance with embodiments of the disclosure.

FIG. 1 shows a structure of an aircraft-based image processing system in accordance with embodiments of the disclosure. The aircraft-based image processing system can comprise an aircraft 101, an image capturing device 102 onboard the aircraft 101 and a control device 103. In some instances, data processing device 104 can be provided in the aircraft 101.

The aircraft 101 can be an unmanned aerial vehicle (UAV) capable of being remotely controlled. The UAV can be a helicopter or a multi-rotor aircraft. The aircraft 101 can comprise a propulsion system and a flight control system.

The image capturing device 102 can be a camera capable of capturing images, recording videos at various resolutions and transmitting the captured image data to the aircraft 101 or directly transmitting the captured image data to the control device 103. In some instances, the image capturing device 102 can be configured to save the captured image data to a memory (e.g., an SD card), such that the aircraft 101 or the control device 103 can read the captured image data.

The data processing device 104 can be an independent device provided in the aircraft 101. Optionally, the data processing device 104 can be a processor provided in the aircraft 101 and being in data connection with other circuits (e.g., a communication circuit). In some instances, the data processing device 104 can be configured to receive an image control instruction from the control device 103, communicate with the image capturing device 102 to perform an image processing operation based upon the image control instruction, and transmit image data obtained from the image processing operation to the control device 103.

The control device 103 can be a remote controller of a ground end, such as a smartphone, a tablet computer, a portable computer, an intelligent wearable device having a communication capability. The control device 103 can communicate with the aircraft 101 and/or the image capturing device 102. In some instances, the control device 103 can be configured to generate the image control instruction, send the image control instruction to the data processing device 104, and receive data from the data processing device 104.

A transmission scheme, an encoding/decoding format and a control logic can be selected between the control device 103 and the data processing device 104 of the aircraft 101. A transmission scheme, an encoding/decoding format and a control logic can be selected between the control device 103 and the image capturing device 102. A transmission scheme, an encoding/decoding format and a control logic can be selected between the data processing device 104 of the aircraft 101 and the image capturing device 102. Data encoding/decoding, data transmission and data control can thus be effected.

The control device 103 can be provided with a mechanical button or an application-based touchscreen button to effect a human-computer interaction, such that the image control instruction can be generated. In some instances, based upon these buttons, the user can effect various functions including an image playback, an image movement, an image scaling, an image paging up/down and an image deleting to images captured by the image capturing device 102.

In some embodiments, the data processing device 104 can be configured to provide obtained human-computer interaction interface UI data to the control device 103. The control device 103 can be configured to display an image and receive an image control instruction to be applied onto the image based upon the human-computer interaction interface UI data.

In other words, a UI can be configured by the data processing device 104. Various types of remote control devices, after being connected to the data processing device 104, can effect a control based upon a graphical interface and operating events in the UI without any application installed. The UI can be configured to display to a user in real time an image transmitted from the image processing device 104 via an image transmission link. The UI data can comprise data of an image display interface and data of operating events corresponding to the functions.

Additionally or alternatively, the data processing device 104 can be configured to obtain human-computer interaction interface UI data of the image capturing device 102 and provide the obtained human-computer interaction interface UI data of the image capturing device 102 to the control device 103. The control device 103 can be configured to display an image and receive an image control instruction to be applied onto the image based upon the human-computer interaction interface UI data of the image capturing device 102.

The data processing device 104 can be configured to obtain data of an interface and operating events of a carried image capturing device 102 based upon a type or a model of the image capturing device 102, and provide the data to the control device 103. The control device 103 can be configured to generate an interaction interface based upon the data to receive operating instructions from the user.

Additionally or alternatively, the data processing device 104 can be configured to provide the obtained human-computer interaction interface UI data to the control device 103. The control device 103 can be configured to add one or more operating events to the received human-computer interaction interface UI, display an image and receive an image control instruction to be applied onto the image based upon the human-computer interaction interface UI data and the added operating events. For instance, the data processing device 104 can be configured to transmit the UI data such as a graphical interface, while the control device 103 can be configured to add logical events corresponding to various functions including an image playback, an image movement, an image zooming, an image paging up/down and an image deleting.

In some instances, dedicated applications APPs can be installed on the control device 103 to effect various functions including an image playback, an image movement, an image zooming, an image paging up/down and an image deleting.

Figure 2:
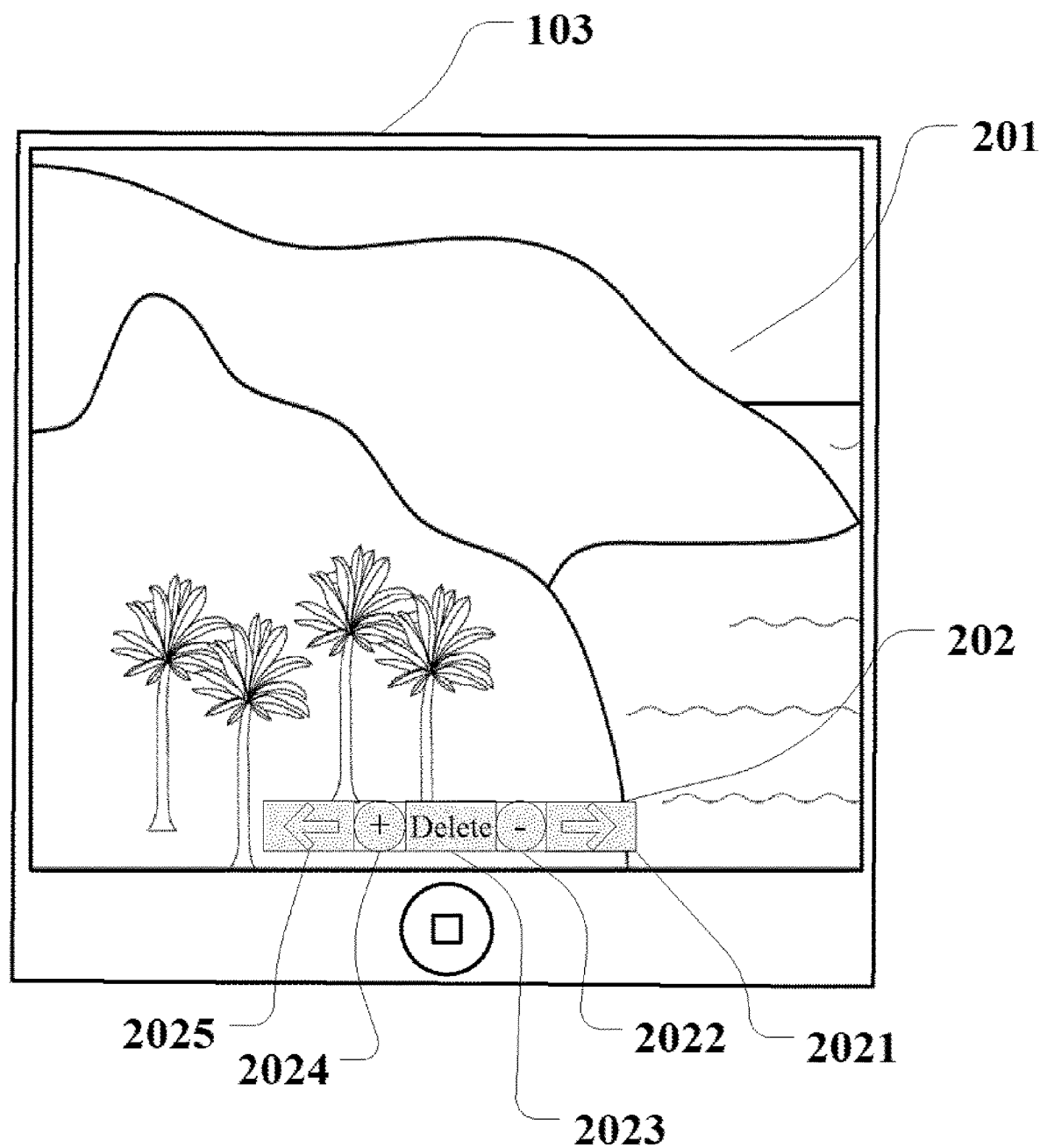
FIG. 2 shows a user interface in accordance with embodiments of the disclosure.

FIG. 2 shows a UI (user interface) presented on the control device 103 to the user. The UI can comprise a display area 201 for displaying an image and a button area 202. The display area 201 can at least display an aerial image received by the control device 103 and an image processed and transmitted by the data processing device 104 (e.g., an enlarged image, a flipped image). The button area 202 can comprise paging up/down buttons (for example a page down button 2021 and a page up button 2025), zooming buttons (for example, a zooming out button 2022 and a zooming in button 2024) and a delete button 2023. Buttons in the button area 202 can be provided to meet actual requirements. For example, the button area 202 can comprise an image translating button or a video playback button. In some instances, user's operation performed within the button area 202 can be directed to an image currently displayed in the display area 201. For example, the page up 2025 can be tapped to view a previous image of the currently displayed image.

It will be appreciated that, the data processing device 104 can convert obtained UI data based upon a type of the control device 103 or a type of operating system of the control device 103, such that the control device 103 can correctly process (e.g., parse and display) the UI data.

In some instances, the user can tap an icon or a button on the UI that is provided with the operating events as discussed hereinabove to trigger a corresponding function. The control device 103 can be configured to, based upon the user's tapping operation or pressing operation, generate an image playback instruction, an image movement instruction, an image zooming instruction, an image paging up/down instruction and/or an image deleting instruction on one or more images, and transmit the generated instruction to the data processing device 104 onboard the aircraft 101 via data transmission link. It will be appreciated that, in addition to an operation instruction, the image playback instruction, image movement instruction, zooming instruction, paging up/down instruction and/or deleting instruction can also comprise an identification of a target image (e.g., an identification of an image that is displayed when the user taps a button) and other relevant content.

In some embodiments, the data processing device 104 can be configured to, upon receiving the image playback instruction, the image movement instruction, the zooming instruction, the paging up/down instruction and/or the deleting instruction on one or more images, perform an image processing operation comprising communicating with the image capturing device 102, obtaining an image identified by the image control instruction, and performing a playback, a movement, a zooming, a paging up/down and/or a deleting process to the obtained image based upon the image control instruction.

Images captured by the image capturing device 102 and to be transmitted to the control device 103 can be stored in a memory unit of the image capturing device (e.g., an SD card). The data processing device 104 can communicate with the image capturing device 102, locate a target image based upon information such as an image identification contained in the image control instruction, and obtain the target image to perform an image processing based upon the image control instruction.

Alternatively or additionally, the image processing operations performed by the data processing device 104 can comprise communicating with the image capturing device 102, processing the received image control instruction and providing the processed image control instruction to the image capturing device 102, The image capturing device 102 can be configured to perform an image processing operation based upon the processed image control instruction and provide image data as a result of the image processing operation to the data processing device 104.

For instance, the data processing device 104 can be configured to encode/decode a received image control instruction, extract an instruction therefrom, convert the extracted instruction to an instruction that is identifiable to the image capturing device 102 and provide the converted instruction to the image capturing device 102, such that the image capturing device 102 can perform an image processing operation based upon the image control instruction. In some instances, the image capturing device 102 can perform an image playback, an image movement, an image zooming, an image paging up/down and an image deleting based upon the image control instruction which is processed by the data processing device 104, and provide processed image data to the data processing device 104. It will be appreciated that, the data processing device 104 can only perform a signal decoding, while other image processing operations can be performed by the image capturing device 102.

Alternatively or additionally, the data processing device 104 can be configured to, upon receiving an image control instruction from the control device 103, suspend an image transmission if the data processing device 104 is currently transmitting images to the control device 103. For instance, the data processing device 104 can stop transmitting a new aerial image if an image control instruction is received.

Alternatively or additionally, the control device 103 can be configured to, upon receiving an image processing operation from the user, temporarily save a currently received image and suspend an image transmission or a processing on a transmitted image if the control device 103 is currently transmitting images to the data processing device 104. For instance, the control device 103 can be configured to, upon detecting user's image processing, not receive a new aerial image or not display a new aerial image even if the new aerial image is received.

It will be appreciated that, the image control instruction can be transmitted between the control device 103 and the aircraft 101 via an existing control link. Data can be transmitted between the data processing device 104 and the image capturing device 102 of the aircraft 101 using a wired or a wireless connection. Data can be transmitted between the aircraft 101 and the control device 103 via a wireless image transmission link.

With the embodiments of the disclosure, the user can effectively manipulate the aerial images to satisfy user's control on aerial images.

Figure 3:
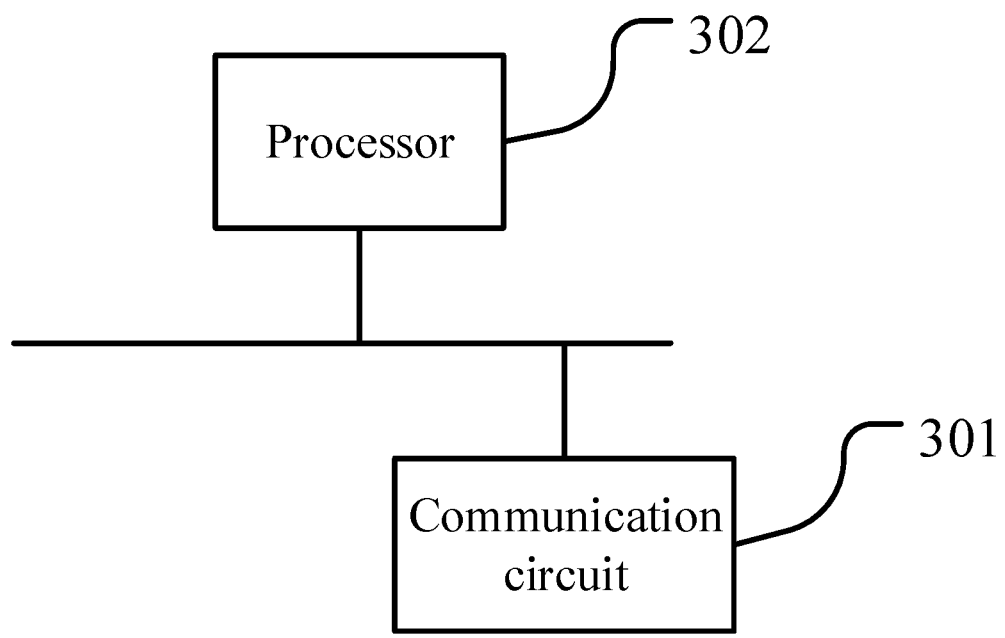
FIG. 3 shows a structure of an image capturing device in accordance with embodiments of the disclosure.

FIG. 3 shows a structure of an image capturing device in accordance with embodiments of the disclosure. The image capturing device described with reference to FIG. 3 can substantially identical to the image capturing device disclosed hereinabove. The image capturing device can be connected with a control device that is configured to control the image capturing device. In some instances, the image capturing device can be a video camera comprising a lens and an optical sensor. In some embodiments of the disclosure, the image capturing device can comprise a communication circuit 301 and a processor 302.

The communication circuit 301 can be configured to communicate with the processor 302 and the control device.

The processor 302 can be configured to receive an image control instruction from the control device, perform an image processing operation based upon the image control instruction in response to the image control instruction, and provide image data as a result of the image processing operation to the control device via the communication circuit 301.

The communication circuit 301 can communicate with a communication circuit of the control device, such that data can be transmitted between the processor 302 and the control device in a wired or a wireless manner. Upon performing an image processing operation based upon the image control instruction, the processor 302 can be configured to, in response to the image control instruction, perform an image playback, an image movement, an image zooming, an image paging up/down and an image deleting based upon the image control instruction.

In some instances, the control device can be configured to effect an interaction with the image capturing device using an installed APP. Optionally, the processor 302 can be configured to send a human-computer interaction interface UI, which is provided on the image capturing device, to the control device. For instance, the processor 302 can be configured to send the obtained human-computer interaction interface UI data to the control device via the communication circuit 301, such that the control device can display an image and receive an image control instruction to be applied onto the image based upon the human-computer interaction interface UI data.

In some instances, the control device can be configured to capture image data using an external camera. The processor 302 can be configured to obtain human-computer interaction interface UI data of the external camera, and send the obtained human-computer interaction interface UI data of the external camera to the control device via the communication circuit 301.

The processor 302 can be configured to send built-in UI data or UI data of an external camera to the control device. In some instances, the processor 302 can convert the UI data based upon a type of the control device or a type of an operating system of the control device, such that the control device can correctly process (e.g., parse and display) the UI data.

Alternatively or additionally, the processor 302 can be configured to, upon the communication circuit 301 receiving an image control instruction from the control device, suspend an image transmission if the processor 302 is currently transmitting images to the control device.

For instance, upon receiving an image control instruction, the processor 302 can suspend an transmission of aerial images, such that a processed image can be transmitted on an original image transmission link and the control device can receive the processed image.

It will be appreciated that, the processor 302 of the image capturing device can be implemented with reference to relevant description of the data processing device as described hereinabove.

Figure 4:
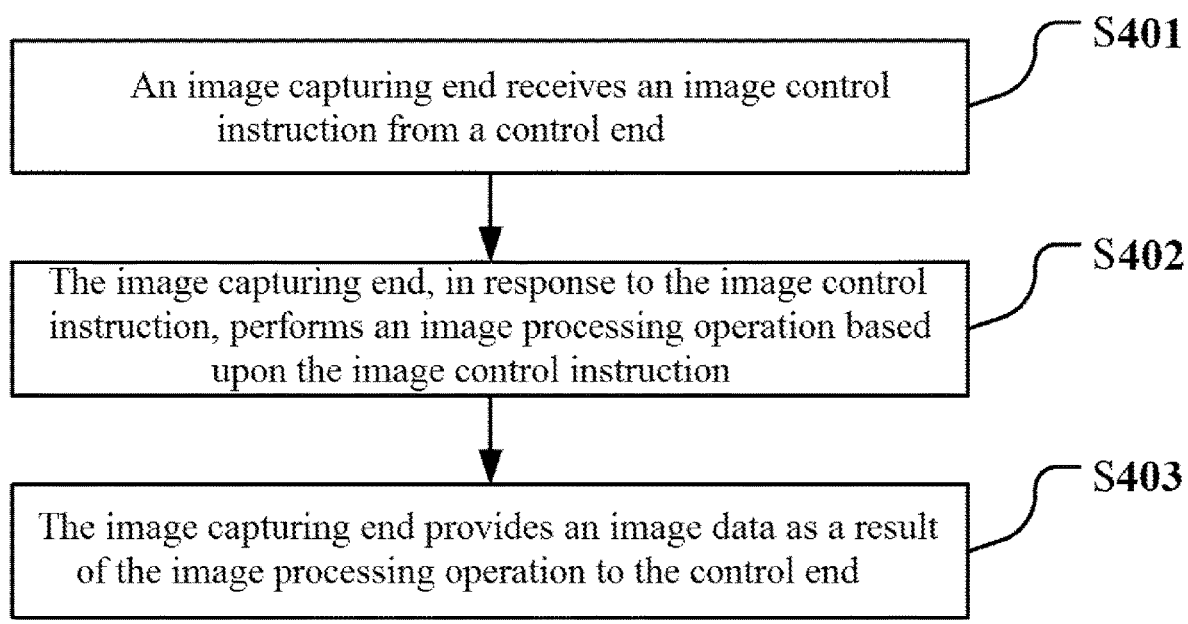
FIG. 4 shows a flowchart of a method of processing image data in accordance with embodiments of the disclosure.

FIG. 4 shows a flowchart of a method of processing image data in accordance with embodiments of the disclosure. The method can be performed at an image capturing end. In some instances, the method can be performed by a camera that captures images in an aerial photography. Optionally, the method can be performed by an aircraft in an aerial photography. The method in accordance with embodiments of the disclosure can comprise steps S401 to S403.

In step S401, a process of an image capturing end receiving an image control instruction from a control end can be performed.

In step S402, a process of the image capturing end, in response to the image control instruction, performing an image processing operation based upon the image control instruction can be performed.

In some instances, the received image control instruction can comprise an image playback instruction, an image movement instruction, an image zooming instruction, an image paging up/down instruction, and/or an image deleting instruction on one or more images.

In step S403, a process of the image capturing end providing image data as a result of the image processing operation to the control end can be performed.

It will be appreciated that, steps of the method in accordance with the embodiments can be implemented with reference to a functional description of relevant devices described with reference to FIG. 1.

Figure 5:
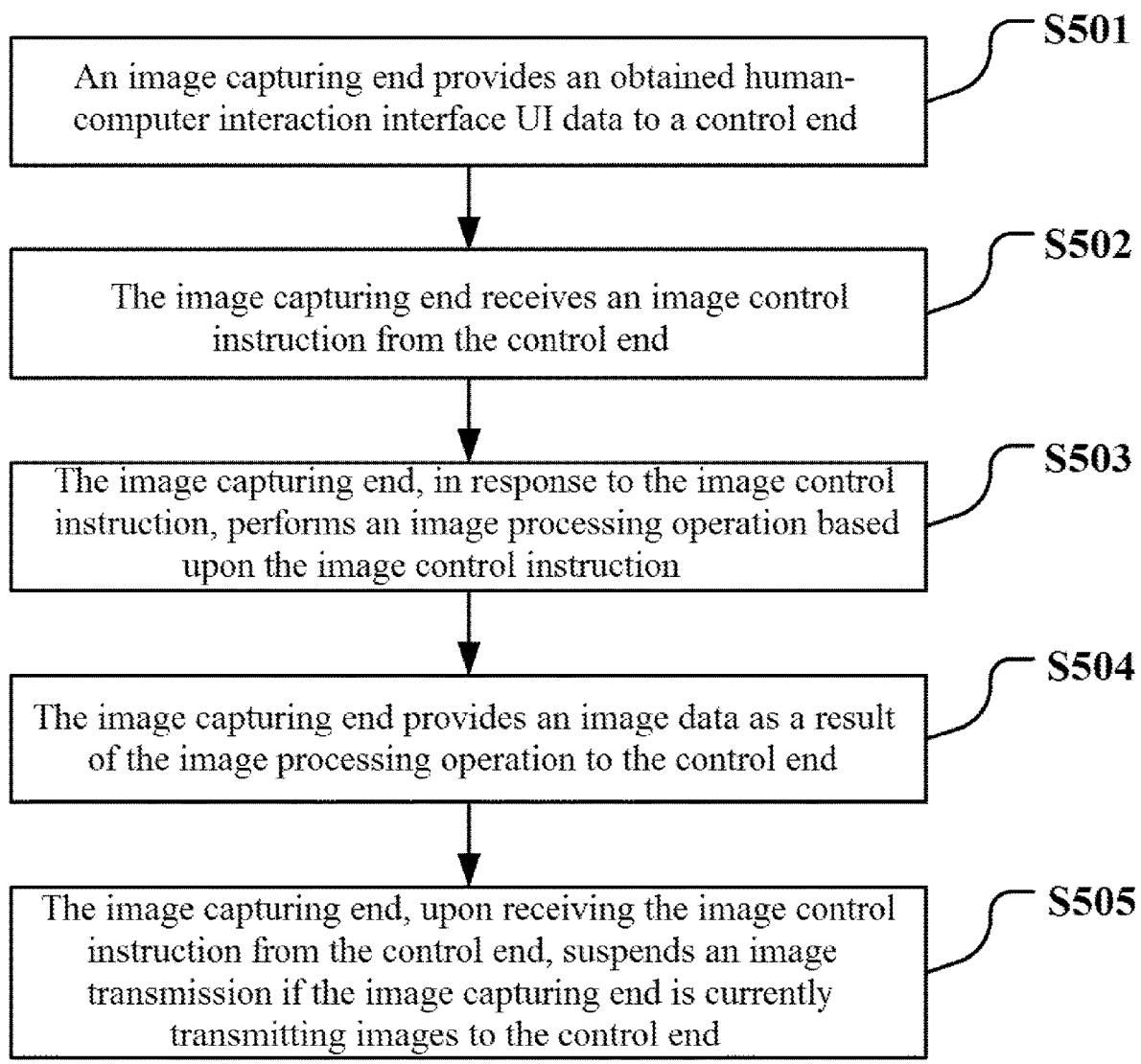
FIG. 5 shows a flowchart of an alternative method of processing image data in accordance with embodiments of the disclosure.

FIG. 5 shows a flowchart of another method of processing image data in accordance with embodiments of the disclosure. The method can be performed at an image capturing end. In some instances, the method can be performed by a camera that captures images in an aerial photography. Optionally, the method can be performed by an aircraft in an aerial photography. The method in accordance with embodiments of the disclosure can comprise steps S501 to S504.

In step S501, a process of an image capturing end providing obtained human-computer interaction interface UI data to a control end can be performed, such that the control end can display an image and receive an image control instruction to be applied onto the image based upon the human-computer interaction interface UI data.

In some instances, the human-computer interaction interface UI can be a UI which is preset at the control end based upon a connected camera. Optionally, the human-computer interaction interface UI can be a human-computer interaction interface UI of a connected camera which is obtained by the image capturing end from the camera.

In some instances, the image capturing end can capture image data using an external camera. The step S501 can comprise a process in which the image capturing end obtaining human-computer interaction interface UI data of the external camera, and providing the obtained human-computer interaction interface UI data of the external camera to the control end.

The control end can be configured to, upon receiving the human-computer interaction interface UI data, perform a necessary data processing and display the UI to the user. One or more operating events can be added if needed. An example of the displayed interface is shown in FIG. 2.

In some instances, the image capturing end can obtain and provide the UI data after establishing a connection with the control end. Optionally, the image capturing end can obtain and provide the UI data after establishing a connection with the control end based upon a manual request from the user.

In step S502, a process of the image capturing end receiving an image control instruction from the control end can be performed.

In some instances, the user can tap an icon button on an interface of the control end as shown in FIG. 2, such that the control end (e.g., a smartphone, a tablet computer and the like) can generate and provide a corresponding image control instruction. The image control instruction can be sent from the control end through a control link which has been established with the image capturing end.

In step S503, a process of the image capturing end, in response to the image control instruction, performing an image processing operation based upon the image control instruction can be performed.

In some instances, the received image control instruction can comprise an image playback instruction, an image movement instruction, an image zooming instruction, an image paging up/down instruction, and/or an image deleting instruction on one or more images.

In some instances, the image processing operation performed by the image capturing end can comprise an image playback, an image movement, an image zooming, an image paging up/down and/or an image deleting on one or more images.

In step S504, a process of the image capturing end providing image data as a result of the image processing operation to the control end can be performed.

Optionally, the method in accordance with embodiments of the disclosure can further comprise a step S505 in which the image capturing end, upon receiving the image control instruction from the control end, suspending an image transmission if the image capturing end is currently transmitting images to the control end.

It will be appreciated that, steps of the method in accordance with the embodiments can be implemented with reference to a functional description of relevant devices described with reference to FIG. 1.

Figure 6:
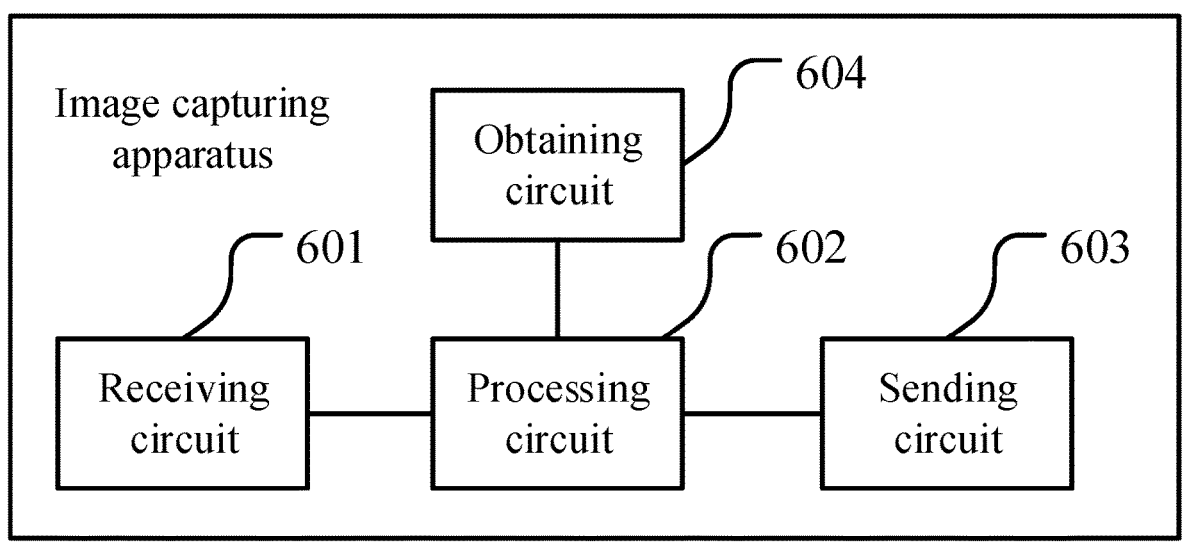
FIG. 6 shows a structure of an image capturing apparatus in accordance with embodiments of the disclosure.

FIG. 6 shows a structure of an image capturing apparatus in accordance with embodiments of the disclosure. In some instances, the image capturing apparatus can be provided to an image capturing device such as a camera. Optionally, the image capturing apparatus can be provided to an aircraft which effects an aerial photography. In some embodiments, the image capturing apparatus can comprise a receiving circuit 601, a processing circuit 602 and a sending circuit 603.

The receiving circuit 601 can be configured to receive an image control instruction from a control end. The processing circuit 602 can be configured to, in response to the image control instruction, performing an image processing operation based upon the image control instruction. The sending circuit 603 can be configured to provide image data as a result of the image processing operation to the control end.

Optionally, the image capturing apparatus can further comprise an obtaining circuit 604 which is configured to obtain human-computer interaction interface UI data. The sending circuit 603 can further be configured to provide a stored human-computer interaction interface UI data to the control end.

In some instances, the image capturing apparatus can capture image data using an external camera. The image capturing apparatus can further comprise the obtaining circuit 604 configured to obtain human-computer interaction interface UI data of the external camera. The sending circuit 603 can further be configured to provide the obtained human-computer interaction interface UI data of the external camera to the control end.

In some instances, the processing circuit 602 can be configured to, in response to the image control instruction, perform an image playback, an image movement, an image zooming, an image paging up/down and/or an image deleting on one or more images based upon the image control instruction.

Optionally, the processing circuit 602 can further be configured to, upon the receiving circuit 601 receiving the image control instruction from the control end, suspend an image transmission if the processing circuit 602 is currently transmitting images to the control end.

It will be appreciated that, circuits of the apparatus in accordance with the embodiments can be implemented with reference to relevant functions and steps described hereinabove.

With the embodiments of the disclosure, the user can effectively manipulate the aerial images to satisfy user's control on aerial images.

Figure 7:
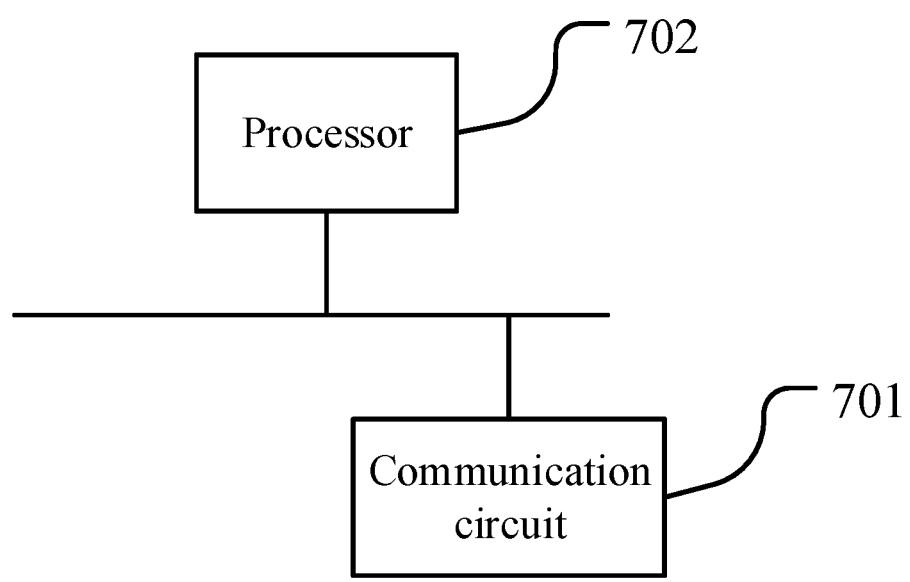
FIG. 7 shows a structure of a control device in accordance with embodiments of the disclosure.

FIG. 7 shows a structure of a control device in accordance with embodiments of the disclosure. The control device can be a dedicated remote control, a smartphone, a tablet computer, an intelligent wearable device or other devices having a communication capability. In some embodiments, the control device can comprise a communication circuit 701 and a processor 702.

The communication circuit 701 can be configured to be in data connection with the image capturing device and the processor 702.

The processor 702 can be configured to generate an image control instruction based upon a user operation, send the generated image control instruction to the image capturing device which is controlled by the processor 702 using the communication circuit 701, receive processed image data from the image capturing device via the communication circuit 701, and display an image corresponding to the processed image data.

The image capturing device can be a camera or an aircraft effecting an aerial photography. The communication circuit 701 can communicate data with the communication circuit 701 of the image capturing device via a wireless transmission.

The processor 702 can be configured to detect a user operation and generate an image control instruction based upon a human-computer interaction interface UI. In some instances, the human-computer interaction interface UI can be a UI of an APP installed and configured by the processor 702. Optionally, the human-computer interaction interface UI can be a UI interface downloaded from an image capturing device.

In some instances, the communication circuit 701 can be configured to receive the human-computer interaction interface UI data from the image capturing end. The processor 702 can be configured to parse the human-computer interaction interface UI data and display the parsed human-computer interaction interface UI, such that a user operation on the UI can be received and an image control instruction can be generated.

In some instances, the UI can comprise an interface graphic and relevant operating events. Optionally, the UI can only comprise an interface graphics, while the operating events can be added by the processor 702. The processor 702 can be configured to parse the human-computer interaction interface UI data and add operating events.

In some instances, the processor 702 can be configured to display the last received image data before displaying the processed image data.

In some instances, the added operating events can comprise a touch event.

In some instances, the human-computer interaction interface UI data can be an data associated with a human-computer interaction interface UI which is configured by the image capturing device. Optionally, the human-computer interaction interface UI data can be an data associated with a human-computer interaction interface UI of an external camera which is connected with the image capturing device.

In some instances, the image control instruction can comprise an image playback instruction, an image movement instruction, an image zooming instruction, an image paging up/down instruction, and/or an image deleting instruction on one or more images.

It will be appreciated that, the communication circuit 701 and the processor 702 of the control device in accordance with the embodiments can be implemented with reference to those embodiments described hereinabove.

Figure 8:
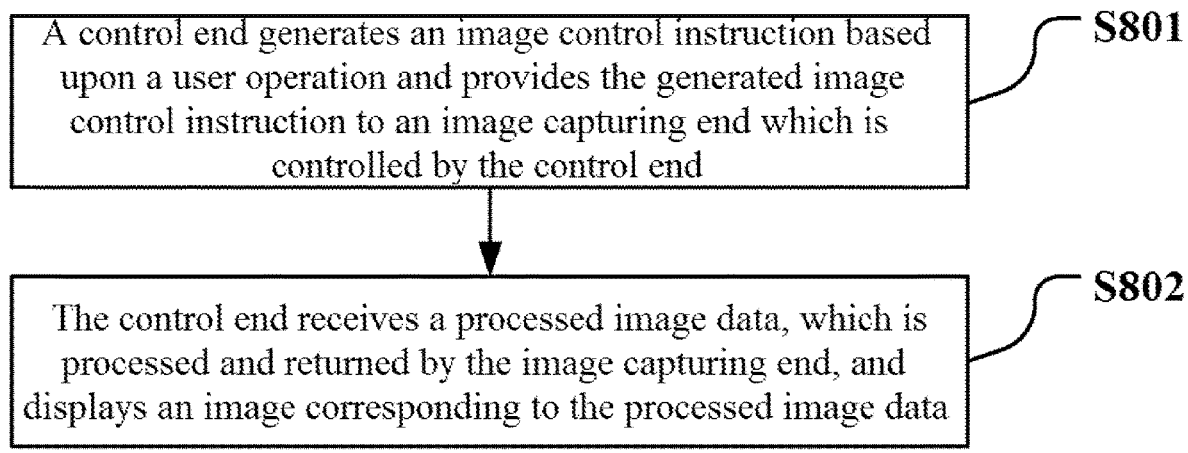
FIG. 8 shows a flowchart of a further method of processing image data in accordance with embodiments of the disclosure.

FIG. 8 shows a flowchart of a further method of processing image data in accordance with embodiments of the disclosure. The method can be performed by a control end such as a dedicated remote control, a smartphone, a tablet computer or an intelligent wearable device. The control end can be configured to control an operation of an image capturing end. In some instances, the image capturing end can be a camera. Optionally, the image capturing end can be an aircraft effecting an aerial photography. In some embodiments, the method can comprise steps S801 and S802.

In step S801, a process of a control end generating an image control instruction based upon a user operation and providing the generated image control instruction to an image capturing end which is controlled by the control end can be performed.

In step S802, a process of the control end receiving processed image data, which is processed and returned by the image capturing end, and displaying an image corresponding to the processed image data can be performed.

The control end can be configured to detect a user operation using an installed APP or a UI obtained from the image capturing end, and generate the image control instruction. The control end can transmit the image control instruction via a transmission link established with the image capturing end.

Upon receiving the image data, the control end can display a corresponding image using the installed APP or the obtained UI.

Figure 9:
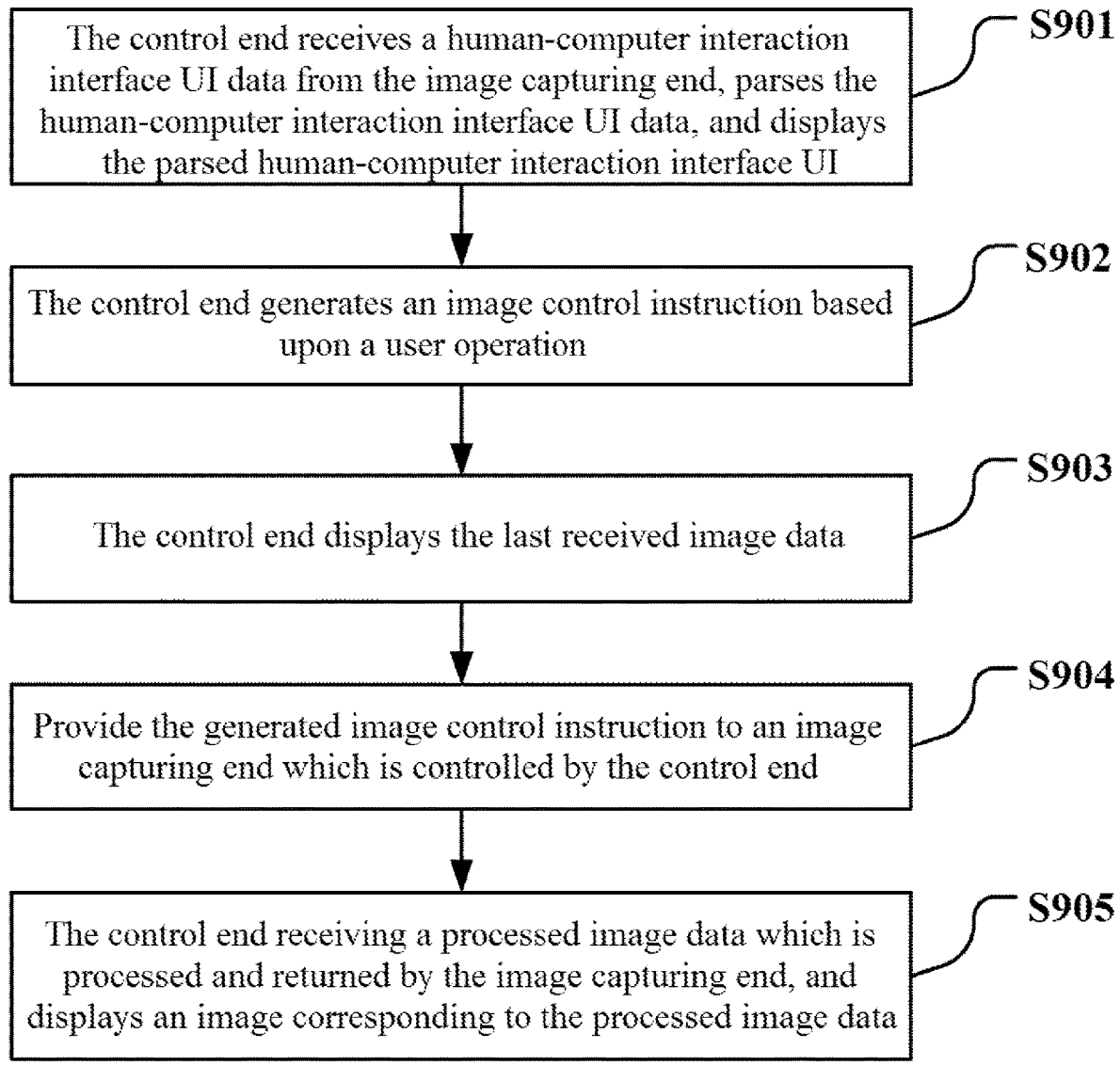
FIG. 9 shows a flowchart of a still further method of processing image data in accordance with embodiments of the disclosure.

FIG. 9 shows a flowchart of a still further method of processing image data in accordance with embodiments of the disclosure. The method can be performed by a control end such as a dedicated remote control, a smartphone, a tablet computer or an intelligent wearable device. In some embodiments, the method can comprise steps S901 to S905.

In step S901, a process can be performed in which the control end receiving human-computer interaction interface UI data from the image capturing end, parsing the human-computer interaction interface UI data, and displaying the parsed human-computer interaction interface UI to receive a user operation on the UI and generate an image control instruction.

In some instances, the human-computer interaction interface UI data can be data associated with a human-computer interaction interface UI which is configured by the image capturing end. Optionally, the human-computer interaction interface UI data can be data associated with a human-computer interaction interface UI of an external camera which is connected with the image capturing end.

The process of the control end parsing the human-computer interaction interface UI data can comprise the control end parsing the human-computer interaction interface UI data and adding operating events. In some instances, the added operating events can comprise a touch event.

In some instances, the control end can request the UI data after establishing a connection with the image capturing end. Optionally, the control end can obtain the UI data of the image capturing end based upon a user's manual request after establishing a connection with the image capturing end.

In step S902, a process of the control end generating an image control instruction based upon a user operation can be performed.

In some instances, the image control instruction generated by the control end can comprise an image playback instruction, an image movement instruction, an image zooming instruction, an image paging up/down instruction, and/or an image deleting instruction on one or more images.

In step S903, a process of the control end displaying the last received image data can be performed.

In step S904, a process of providing the generated image control instruction to an image capturing end which is controlled by the control end can be performed.

In step S905, a process of the control end receiving processed image data which is processed and returned by the image capturing end, and displaying an image corresponding to the processed image data can be performed.

It will be appreciated that, the steps of method in accordance with the embodiments can be implemented with reference to those embodiments described hereinabove.

Figure 10:
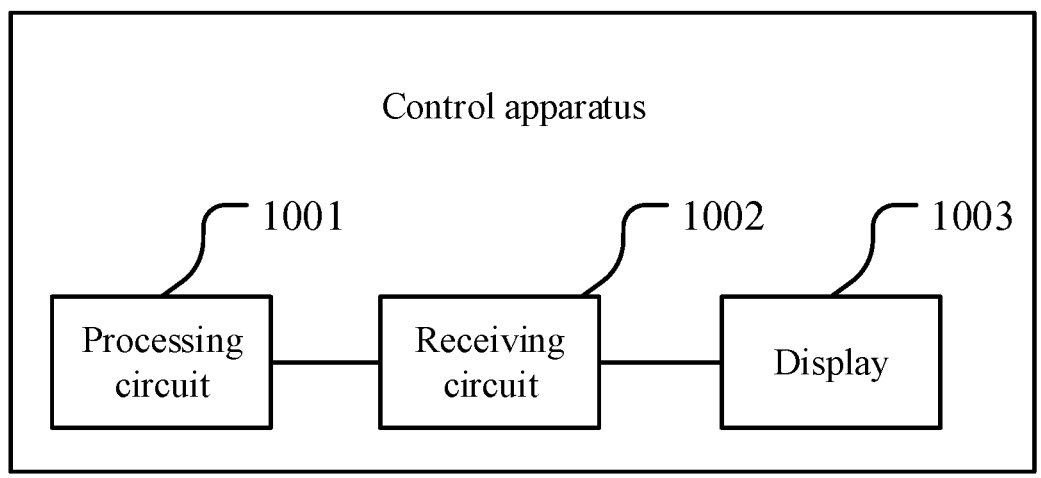
FIG. 10 shows a structure of a control apparatus in accordance with embodiments of the disclosure.

FIG. 10 shows a structure of a control apparatus in accordance with embodiments of the disclosure. The control apparatus can be provided in a dedicated remote control, a smartphone, a tablet computer or an intelligent wearable device. In some embodiments, the control apparatus can comprise a processing circuit 1001, a receiving circuit 1002 and a display 1003.

The processing circuit 1001 can be configured to generate an image control instruction based upon a user operation and provide the generated image control instruction to an image capturing end which is controlled by the processing circuit. The receiving circuit 1002 can be configured to receive image data which is processed and returned by the image capturing end. The display 1003 can be configured to display an image corresponding to the processed image data.

Optionally, the display 1003 can further be configured to display the last received image data before displaying the processed image data.

Optionally, the receiving circuit 1002 can further be configured to receive human-computer interaction interface UI data from the image capturing end. The processing circuit 1001 can further be configured to parse the human-computer interaction interface UI data. The display 1003 can further be configured to display the parsed human-computer interaction interface UI, such that a user operation on the UI can be received and the image control instruction can be generated.

Optionally, the processing circuit 1001 can be configured to parse the human-computer interaction interface UI data and add operating events.

In some instances, the operating events added by the processing circuit 1001 can comprise a touch event.

In some instances, the human-computer interaction interface UI data can be data associated with a human-computer interaction interface UI which is configured by the image capturing end. Optionally, the human-computer interaction interface UI data can be data associated with a human-computer interaction interface UI of an external camera which is connected with the image capturing end.

In some instances, the image control instruction generated by the processing circuit 1001 can comprise an image playback instruction, an image movement instruction, an image zooming instruction, an image paging up/down instruction, and/or an image deleting instruction on one or more images.

It will be appreciated that, various circuit units of the control apparatus in accordance with the embodiments can be implemented with reference to those embodiments described hereinabove.

With the embodiments of the disclosure, the user can effectively manipulate the aerial images to satisfy user's control on aerial data.

It will be appreciated that, the relevant device and method disclosed in embodiments of the disclosure can be implemented in other manners. For example, the described device embodiments are merely illustrative. For example, a division of circuits or units is merely a division based upon a logical function. Various division can be possible in actual implementation. For example, multiple units or components can be combined or integrated on another system. For example, some features can be ignored or not be performed. For example, a mutual coupling, a direct coupling or a communication connection as shown or discussed can be an indirect coupling or a communication connection via an interface, a means or an unit. The coupling can be an electrical coupling or a mechanical coupling.

The units illustrated as separate parts may or may not be physically separated. The parts shown as units may or may not be physical units. For example, the parts can be provided at the same location or distributed over a plurality of network units. All or part of the circuits can be selected to implement the embodiments of the disclosure according to actual requirements.

Various functional units in the embodiments of the disclosure may be integrated in one processing unit. The functional units can be separate and physical units. Two or more units may be integrated in one unit. The integrated units may be implemented as hardware or software functional units.

The integrated units, if implemented as software functional units and sold or used as independent products, may be stored in a computer-readable storage medium. With such an understanding, essentially the technical solution of the disclosure, or a part making contribution over the prior art, or all or part of the technical solution may be embodied as a software product. The computer software product is stored in a storage medium and includes several instructions for causing a computer processor to execute all or part of steps of the method according to the various embodiments of the present disclosure. The above mentioned storage medium includes: various media capable of storing program code, such as a U disk, a removable hard disk, ROM (read-only memory), RAM (random access memory), a diskette, an optical disk, etc.

The foregoing embodiments are intended to merely illustrate rather than limit the scope of the present disclosure. Numerous equivalent structures or equivalent flow variations made in light of the specification and the accompanying drawings of the present disclosure, whether directly or indirectly applied to other related technical art, are within the scope of the present disclosure.

What is claimed is:

1. A method of processing image data comprising:
   transmitting, by an image capturing end via a wireless image transmission link, captured image data to a control end,
   providing, by the image capturing end, human-computer interaction interface UI data to the control end, including:
      transmitting, by the image capturing end, the human-computer interaction interface UI data of a human-computer interaction interface UI of the image capturing end to the control end, the human-computer interaction interface UI data being configured to enable the control end to parse the human-computer interaction interface UI data to display a parsed human-computer interaction interface UI at the control end and to receive a user operation on the parsed human-computer interaction interface UI to generate an image control instruction,
   receiving, by the image capturing end, the image control instruction from the control end, the image control instruction being configured to instruct the image capturing end to perform an image processing operation, the image control instruction including at least one of an image playback instruction, an image paging up/down instruction, or an image deleting instruction,
   performing, by the image capturing end in response to the image control instruction, the image processing operation based upon the image control instruction to obtain processed image data,
   suspending, by the image capturing end in response to receiving the image control instruction, transmission of the captured image data, and
   switching, by the image capturing end in response to receiving the image control instruction, to transmit the processed image data via the wireless image transmission link to the control end,
   wherein the parsed human-computer interaction interface UI includes:
      a display area for displaying at least one of an image corresponding to the captured image data or an image corresponding to the processed image data, and
      a plurality of buttons for receiving the user operation directed to an image currently displayed in the display area, the plurality of buttons including a paging up button, a paging down button, a zooming in button, a zooming out button, a delete button, a playback button, and an image translating button.

2. The method of claim 1,
   wherein the image capturing end is configured to capture image data using an external camera,
   the method further comprising:
      obtaining, by the image capturing end, human-computer interaction interface UI data of the external camera; and
      providing the obtained human-computer interaction interface UI data of the external camera to the control end.

3. The method of claim 1, wherein the image control instruction further comprises one of an image zooming instruction and an image movement instruction.

4. An image capturing device comprising:
   a communication circuit configured to communicate with a control device; and
   a processor coupled to the communication circuit and configured to:
      transmit captured image data to the control device via the communication circuit using a wireless image transmission link,
      provide human-computer interaction interface UI data to the control device, including:
         transmitting the human-computer interaction interface UI data of a human-computer interaction interface UI of the image capturing device to the control device, the human-computer interaction interface UI data being configured to enable the control device to parse the human-computer interaction interface UI data to display a parsed human-computer interaction interface UI at the control device and to receive a user operation on the parsed human-computer interaction interface UI to generate an image control instruction,
      receive the image control instruction from the control device via the communication circuit, the image control instruction being configured to instruct the image capturing end to perform an image processing operation, the image control instruction including at least one of an image playback instruction, an image paging up/down instruction, or an image deleting instruction,
      perform, in response to the image control instruction, the image processing operation based upon the image control instruction to obtain processed image data,
      suspend, in response to receiving the image control instruction, transmission of the captured image data to the control device, and
      switch, in response to receiving the image control instruction, to transmit the processed image data to the control device via the communication circuit using the wireless image transmission link,
   wherein the parsed human-computer interaction interface UI includes:
      a display area for displaying at least one of an image corresponding to the captured image data or an image corresponding to the processed image data, and
      a plurality of buttons for receiving the user operation directed to an image currently displayed in the display area, the plurality of buttons including a paging up button, a paging down button, a zooming in button, a zooming out button, a delete button, a playback button, and an image translating button.

5. The device of claim 4, wherein:
   the device is configured to capture image data using an external camera, and
   the processor is further configured to:
      obtain human-computer interaction interface UI data of the external camera, and provide the obtained human-computer interaction interface UI data of the external camera to the control device via the communication circuit.

6. A method of processing image data comprising:
receiving, by a control end via a wireless image transmission link, captured image data from an image capturing end controlled by the control end,
receiving, by the control end, human-computer interaction interface UI data from the image capturing end,
parsing, by the control end, the human-computer interaction interface UI data,
displaying, by the control end, the parsed human-computer interaction interface UI to receive a user operation on the UI,
displaying, by the control end, an image corresponding to the captured image data,
generating, by the control end, an image control instruction based upon the user operation, the image control instruction including at least one of an image playback instruction, an image paging up/down instruction, or an image deleting instruction,
providing, by the control end, the generated image control instruction to the image capturing end,
changing, by the control end, from receiving the captured image data to receiving processed image data via the wireless image transmission link, wherein the processed image data is processed and returned by the image capturing end in response to the image control instruction,
displaying, by the control end, an image corresponding to the processed image data, and
suspending, in response to detecting a user image processing instruction, displaying of an image corresponding to newly received image data,
wherein displaying the parsed human-computer interaction interface UI includes:
    displaying a display area for displaying at least one of the image corresponding to the captured image data or the image corresponding to the processed image data, and
    displaying a plurality of buttons for receiving the user operation directed to an image currently displayed in the display area, the plurality of buttons including a paging up button, a paging down button, a zooming in button, a zooming out button, a delete button, a playback button, and an image translating button.

7. The method of claim 6, wherein parsing the human-computer interaction interface UI data comprises parsing the human-computer interaction interface UI data and adding an operating event.

8. The method of claim 7, wherein the added operating event comprises a touch event.

9. The method of claim 6, wherein the human-computer interaction interface UI data includes:
data associated with a human-computer interaction interface UI configured in the image capturing end, or
data associated with a human-computer interaction interface UI of an external camera connected with the image capturing end.

10. The method of claim 6, wherein the image control instruction further comprises one of an image movement instruction and an image zooming instruction.

11. A control device comprising:
a communication circuit configured to:
    communicate with an image capturing device controlled by the control device, and
    receive human-computer interaction interface UI data from the image capturing device, and
a processor coupled to the communication circuit and configured to:
    receive captured image data from the image capturing device via the communication circuit using a wireless image transmission link,
    parse the human-computer interaction interface UI data,
    display the parsed human-computer interaction interface UI to receive a user operation on the parsed human-computer interaction interface UI,
    display an image corresponding to the captured image data,
    generate an image control instruction based upon the user operation, the image control instruction including at least one of an image playback instruction, an image paging up/down instruction, or an image deleting instruction,
    provide the generated image control instruction via the communication circuit to the image capturing device,
    change from receiving the captured image data to receiving processed image data via the communication circuit using the wireless image transmission link, wherein the processed image data is processed and returned by the image capturing device in response to the image control instruction,
    display an image corresponding to the processed image data, and
    suspend, in response to detecting a user image processing instruction, displaying of an image corresponding to newly received image data,
    wherein the parsed human-computer interaction interface UI includes:
        a display area for displaying at least one of the image corresponding to the captured image data or the image corresponding to the processed image data, and
        a plurality of buttons for receiving the user operation directed to an image currently displayed in the display area, the plurality of buttons including a paging up button, a paging down button, a zooming in button, a zooming out button, a delete button, a playback button, and an image translating button.

12. The device of claim 11, wherein the processor is configured to parse the human-computer interaction interface UI data and add an operating event.

13. The device of claim 12, wherein the operating event comprises a touch event.

14. The device of claim 11, wherein the human-computer interaction interface UI data includes:
data associated with a human-computer interaction interface UI configured in the image capturing device, or
data associated with a human-computer interaction interface UI of an external camera connected with the image capturing device.

15. An aircraft-based image processing system comprising:
an aircraft including a data processing device;
an image capturing device carried by the aircraft; and
the control device of claim 11,
wherein:
    the image capturing device is configured to capture image data during a flight of the aircraft, the data processing device is configured to:
- transmit the captured image data to the control device via a wireless image transmission link,
- receive an image control instruction from the control device, the image control instruction being configured to instruct the data processing device to perform an image processing operation,
- communicate with the image capturing device,
- perform the image processing operation on the captured image data based upon the image control instruction to obtain processed image data,
- suspend, in response to receiving the image control instruction, transmission of the captured image data to the control device, and
- switch, in response to receiving the image control instruction, to transmit the processed image data to the control device via the wireless image transmission link, and the control device is configured to:
- receive the captured image data from the data processing device via the wireless image transmission link,
- generate the image control instruction,
- provide the image control instruction to the data processing device, and
- change from receiving the captured image data to receiving the processed image data via the wireless image transmission link from the data processing device.

16. The system of claim 15, wherein the control device is configured to, upon detecting the user image processing instruction, suspend receiving new captured image data.

17. The system of claim 15, wherein:
the data processing device is configured to resume transmission of new captured image data to the control device via the wireless image transmission link after the processed image data is transmitted, and
the control device is configured to resume reception of the new captured image data via the wireless image transmission link after the processed image data is displayed.

* * * * *